No. 718,358. PATENTED JAN. 13, 1903.
G. M. KNEUPER.
FILTER.
APPLICATION FILED SEPT. 16, 1902.
NO MODEL.
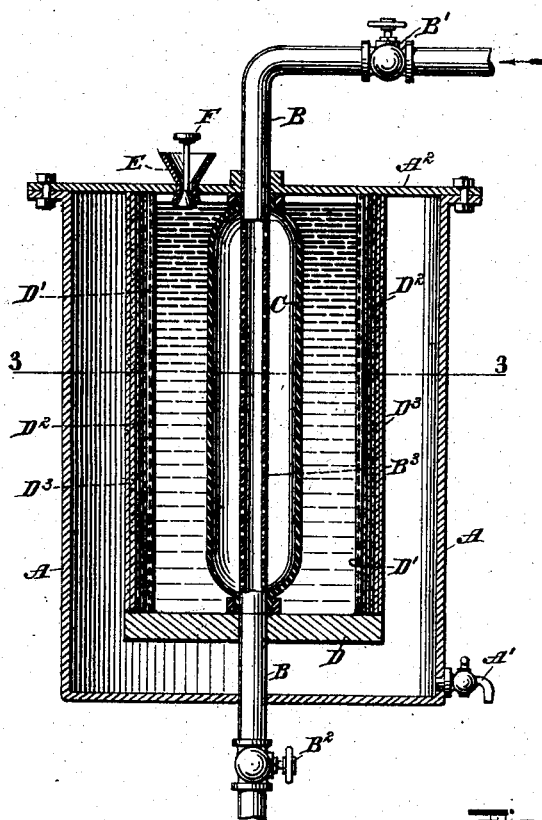
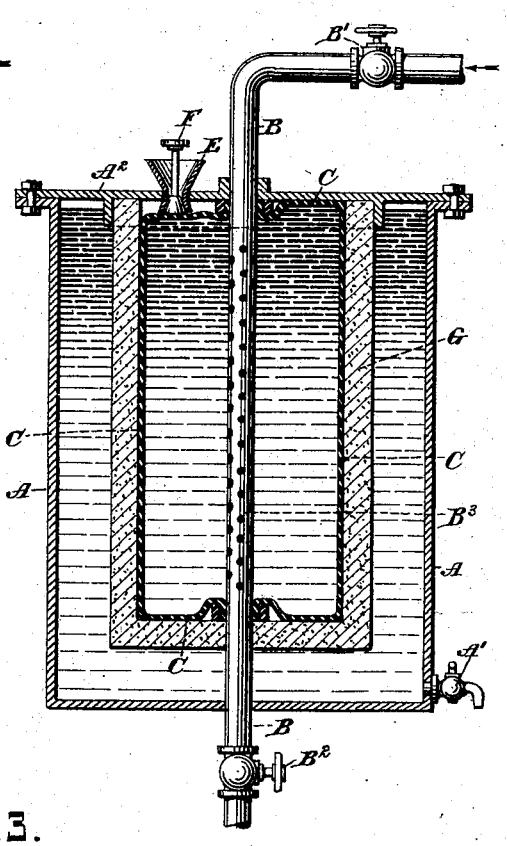
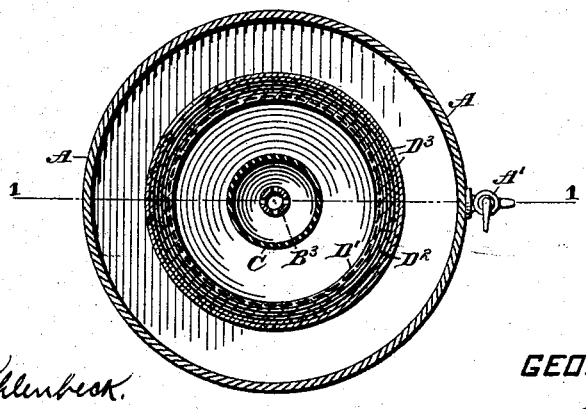
WITNESSES:
INVENTOR
GEO. M. KNEUPER
BY Briesen & Knauth
HIS ATTORNEYS

UNITED STATES PATENT OFFICE.

GEORGE M. KNEUPER, OF NEW YORK, N. Y.

FILTER.

SPECIFICATION forming part of Letters Patent No. 718,358, dated January 13, 1903.

Application filed September 16, 1902. Serial No. 123,629. (No model.)

*To all whom it may concern:*

Be it known that I, GEORGE M. KNEUPER, a citizen of the United States, residing in the borough of Manhattan, city, county, and State of New York, have invented certain new and useful Improvements in Filters, of which the following is a specification.

My invention relates to filters, and is especially designed to provide an apparatus for the rapid filtration of tinctures, syrups, liquors, fruit-juices, fluid extracts, perfumes, &c., and for straining catchups, herbs, sauces, jams, and the like.

The object of my invention is not only to accelerate the filtering action, but to be able to employ a more efficient medium than can be used under the ordinary pressure. Other features and advantages of my invention will appear from the description following hereinafter, and particularly from the appended claims.

Reference is to be had to the accompanying drawings, in which—

Figure 1 is a sectional elevation of one form of my invention, taken on the line 1 1 of Fig. 3. Fig. 2 is a similar view of another form of my invention, and Fig. 3 is a cross-section on line 3 3 of Fig. 1.

The improved filter comprises three main parts—to wit, an expansible pressure-exerting chamber or pouch, a filter proper, and a receptacle adapted to receive the liquid or fluid driven through the filter.

In Figs. 1 and 2 the receptacle A is so arranged as to surround and contain the filter proper; but this is not absolutely essential. The receptacle A is shown provided with an outlet controlled by a faucet A'. The top $A^2$ of the receptacle A supports or at least receives a pipe B, the connection of which with a source of fluid under pressure is controlled by a valve B'. This pipe preferably extends out through the bottom of the receptacle A and is there provided with a valve $B^2$. That portion of the pipe B which is within the pressure-exerting pouch to be described presently, is provided with perforations $B^3$, through which the fluid supplied under pressure may enter the interior of said pouch. In most cases it will be sufficient to connect the pipe B with a water-main; but where the head does not provide the required pressure a pump or other device may be used to produce the desired degree of pressure.

The pouch C is made of rubber or other expansible material and fits tightly around the pipe B at the ends of the perforated portion thereof, so that all the perforations $B^3$ are located within the pouch. Preferably the pouch is so constructed that it may be expanded by the fluid supplied through the pipe B into practically continuous contact with the surrounding walls of the filter proper. This filter proper may, as shown in Figs. 1 and 3, consist of an impervious bottom plate D with a cage D' of wire-gauze or other apertured material extending upward to the cover $A^2$. On the outside of this cage is placed the filtering material, such as several layers of filtering-paper $D^2$, held in position by wrapping cheese-cloth $D^3$, or like material around them. The substance or liquid to be filtered is introduced through an opening or filling-funnel E, preferably provided with an outwardly-closing valve F.

Fig. 1 shows the pouch C in its deflated or collapsed condition, the valve B' being closed. The filter proper is then filled with the fluid to be filtered, as shown in said figure, and then the valve B' is opened. The pressure of the fluid passing from the pipe B into the pouch C will expand the latter, thus causing the valve F to close at once and forcing the liquid contained in the filter gradually through the meshes of the cage D' and through the filtering substances $D^2 D^3$. The material thus forced through the filter collects in the receptacle A and may be withdrawn at the outlet A'. When it is desired to thoroughly expel from the filtering material the liquid which may still adhere thereto, I may at the completion of the filtering operation above described close the valve B' and open the valve $B^2$, so as to allow the pouch C to collapse. If then pressure is again exerted to expand the pouch, the air contained in the central space of the filter will be forced through the filtering material $D^2 D^3$ and will thus expel any liquid which may still be contained in said filtering substances. It will be seen by reference to Fig. 2 that the pouch C may expand until it actually engages the inner wall of the filter, and thus practically every particle of liquid is driven out of the filter.

When it is desired to filter a fresh amount of liquid, the pouch C is caused to collapse by closing the valve B' and opening the valve B², and a new amount of liquid is poured in through the funnel E.

The apparatus shown in Fig. 2 differs from that illustrated by Fig. 1 only in the construction of the filter proper. In Fig. 2 the filter proper, G, consists of what is known as a "porous cell"—that is, a receptacle made of porous material. The action is exactly the same as described with reference to Fig. 1.

I find that my improved filter permits of very rapidly filtering fluids, and particularly liquids of various kinds; and in many cases the time necessary for filtration is considerably less than one-tenth of the time usually employed.

Another advantage of my improvement is that owing to the high rate of pressure which it is possible to employ I may employ filtering material of much greater density than usual and therefore of greater efficiency. I am thus enabled to obtain by one operation a filtrate which is equal in clearness to that resulting from a large number of successive filtrations made in the customary way. When air pressure is employed to drive out any liquid which may have remained in the filtering substance, as hereinbefore described. I efficiently overcome the drawback and loss which are due to capillary attraction. The loss due to evaporation may be eliminated by placing the filtering apparatus in a suitably-constructed cooling vessel.

Another advantage of my invention is that practically the entire surface of the filter proper may be a filtering-surface, and thus a clogging of the filter is much less liable to occur than with the customary constructions, in which the outlet area of the filter is relatively restricted.

My improved filter can be used in any desired position, whether vertical or horizontal. When the filter is constructed according to Figs. 1 and 3—that is, with a detachable filtering material—the deposit or residue from the filtrate may be readily recovered by unwrapping the filtering material from the cage D'. The strain to which the walls of the pouch are subjected is very small, inasmuch as the internal pressure is resisted by the pressure of the liquid to be filtered which surrounds the pouch. Hence a very thin pouch can be used, and the apparatus, therefore, is comparatively inexpensive.

Various modifications may be made without departing from the nature of my invention.

What I claim as new, and desire to secure by Letters Patent, is—

1. The combination with an expansible pouch having means for the introduction of a medium under pressure, of a closed pervious vessel surrounding said pouch and adapted to contain a fluid to be driven out from said vessel by the expansion of the pouch.

2. The combination with an expansible and practically impermeable pouch having means for the introduction of a medium under pressure, of a pervious closed vessel surrounding said pouch and adapted to contain a fluid which is expelled from said vessel by the expansion of the pouch.

3. The combination with an expansible pouch having means for introducing a medium under pressure, and also means for allowing the pouch to collapse, of a pervious vessel surrounding said pouch and adapted to contain a fluid to be driven out by the expansion of the pouch.

4. The combination with an expansible pouch and a tube communicating with the interior of the pouch and adapted for connection with a source of fluid-pressure, of a pervious vessel surrounding said pouch and adapted to contain a fluid to be expelled by the expansion of the pouch.

5. The combination with an expansible pouch, of a tube extending through said pouch and having at one side a valve-controlled inlet for the admission of a medium under pressure, and at the other side a valve-controlled outlet, that portion of the tube which is within the pouch being apertured so that it communicates with the interior of the pouch, and a pervious vessel surrounding said pouch and adapted to contain a fluid to be expelled by the expansion of the pouch.

6. The combination with an expansible pouch and means for the introduction of a fluid under pressure into said pouch, of a pervious vessel surrounding said pouch and adapted to receive a fluid to be expelled from said vessel by the expansion of the pouch, and a self-closing valve arranged at the filling-opening of said vessel.

7. The combination with an expansible pouch having means for the introduction of a fluid under pressure, of a closed pervious vessel surrounding said pouch and adapted to contain a fluid to be expelled from said vessel by the expansion of said pouch, and an outer receptacle containing said vessel and adapted to receive the fluid expelled therefrom.

In testimony whereof I have hereunto set my hand in the presence of two subscribing witnesses.

GEORGE M. KNEUPER.

Witnesses:
JOHN LOTKA,
EUGENE EBLE.